United States Patent
Nakamura et al.

(10) Patent No.: US 11,894,780 B2
(45) Date of Patent: Feb. 6, 2024

(54) POWER CONVERSION UNIT

(71) Applicant: TOSHIBA MITSUBISHI-ELECTRIC INDUSTRIAL SYSTEMS CORPORATION, Chuo-ku (JP)

(72) Inventors: Koki Nakamura, Chuo-ku (JP); Toshiki Nakamori, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 292 days.

(21) Appl. No.: 17/428,479

(22) PCT Filed: Nov. 22, 2019

(86) PCT No.: PCT/JP2019/045780
§ 371 (c)(1),
(2) Date: Aug. 4, 2021

(87) PCT Pub. No.: WO2021/100195
PCT Pub. Date: May 27, 2021

(65) Prior Publication Data
US 2022/0115943 A1    Apr. 14, 2022

(51) Int. Cl.
*H02M 7/00*    (2006.01)
*H02M 5/458*    (2006.01)
*H02M 1/12*    (2006.01)

(52) U.S. Cl.
CPC .......... *H02M 7/003* (2013.01); *H02M 1/123* (2021.05); *H02M 5/4585* (2013.01)

(58) Field of Classification Search
CPC .............................. H02M 3/003; H02M 7/003
See application file for complete search history.

(56) References Cited

U.S. PATENT DOCUMENTS

| | | | | |
|---|---|---|---|---|
| 2004/0207968 | A1* | 10/2004 | Martin ............... | H05K 7/20927 257/E23.098 |
| 2015/0214857 | A1* | 7/2015 | Kosuga ..................... | B60L 3/04 318/400.26 |
| 2019/0089243 | A1* | 3/2019 | Naito ..................... | H01F 37/00 |

FOREIGN PATENT DOCUMENTS

| JP | 2000-312484 A | 11/2000 |
|---|---|---|
| JP | 2001-37255 A | 2/2001 |

(Continued)

OTHER PUBLICATIONS

E. Gurpinar and A. Castellazzi, "Single-Phase T-Type Inverter Performance Benchmark Using Si IGBTs, SiC MOSFETs, and GaN HEMTs," in IEEE Transactions on Power Electronics, vol. 31, No. 10, pp. 7148-7160, Oct. 2016 (Year: 2016).*

(Continued)

*Primary Examiner* — Peter M Novak
(74) *Attorney, Agent, or Firm* — Oblon, McClelland, Maier & Neustadt, L.L.P.

(57) ABSTRACT

A power conversion unit includes a plurality of semiconductor modules, a gate drive circuit, a first substrate having a flat plate shape, and a second substrate having a flat plate shape. The first substrate has a first surface facing a bottom plate of a casing accommodating the semiconductor modules and the gate drive circuit, and a second surface on an opposite side to the first surface. The second substrate is arranged above the first substrate in parallel with the second surface. The semiconductor modules are mounted on the first surface. The gate drive circuit is formed on a surface of the second substrate on a side that does not face the second surface. The power conversion unit further includes a connector provided on the second surface and connected to a surface on a side facing the second substrate.

3 Claims, 5 Drawing Sheets

(56) References Cited

FOREIGN PATENT DOCUMENTS

JP          2011-244572 A      12/2011
JP          2016-174488 A       9/2016

OTHER PUBLICATIONS

International Search Report dated Dec. 24, 2019 in PCT/JP2019/045780 filed on Nov. 22, 2019, 2 pages.
International Preliminary Report on Patentability and Written Opinion dated Jun. 2, 2022 in PCT/JP2019/045780 filed on Nov. 22, 2019, 17 pages (with English Translation).
Indian Office Action dated Jul. 22, 2022 in Indian Patent Application No. 202117040340, 6 pages.

* cited by examiner

POWER CONVERSION UNIT

TECHNICAL FIELD

The present disclosure relates to a power conversion unit.

BACKGROUND ART

Japanese Patent Laying-Open No. 2011-244572 (PTL 1) discloses a power conversion unit including semiconductor devices such as IGBTs (Insulated Gate Bipolar Transistors). In the power conversion unit, a gate drive circuit is connected to each of a plurality of semiconductor devices that constitute an inverter circuit, through a gate drive cable. The gate drive circuit switches a gate drive voltage applied to each semiconductor device to ON or OFF, whereby the semiconductor devices perform switching operation.

CITATION LIST

Patent Literature

PTL 1: Japanese Patent Laying-Open No. 2011-244572

SUMMARY OF INVENTION

Technical Problem

In the power conversion unit described in PTL 1 above, common mode noise occurs in the gate drive cable in the switching operation of the semiconductor devices. In order to reduce this common mode noise, a common mode reactor or a hollow core is inserted in the gate drive cable.

In the configuration above, while the common mode reactor reduces common mode noise, installation of the common mode reactor or the core may lead to size increase and cost increase of the power conversion unit.

The present invention is made in order to solve such a problem, and an object of the present invention is to provide a power conversion unit with a smaller size and with reduced noise.

Solution to Problem

A power conversion unit according to the present disclosure includes a plurality of semiconductor modules each having a semiconductor switching element, a gate drive circuit that drives the semiconductor modules, a first substrate having a flat plate shape, and a second substrate having a flat plate shape. The first substrate has a first surface facing a bottom plate of a casing accommodating the semiconductor modules and the gate drive circuit, and a second surface on an opposite side to the first surface. The second substrate is arranged above the first substrate in parallel with the second surface. The semiconductor modules are mounted on the first surface. The gate drive circuit is formed on a surface of the second substrate on a side that does not face the second surface. The power conversion unit further includes a connector provided on the second surface and connected to a surface on a side facing the second substrate.

Advantageous Effects of Invention

According to the present disclosure, a power conversion unit with a smaller size and with reduced noise is provided.

DESCRIPTION OF EMBODIMENTS

Figure 1:
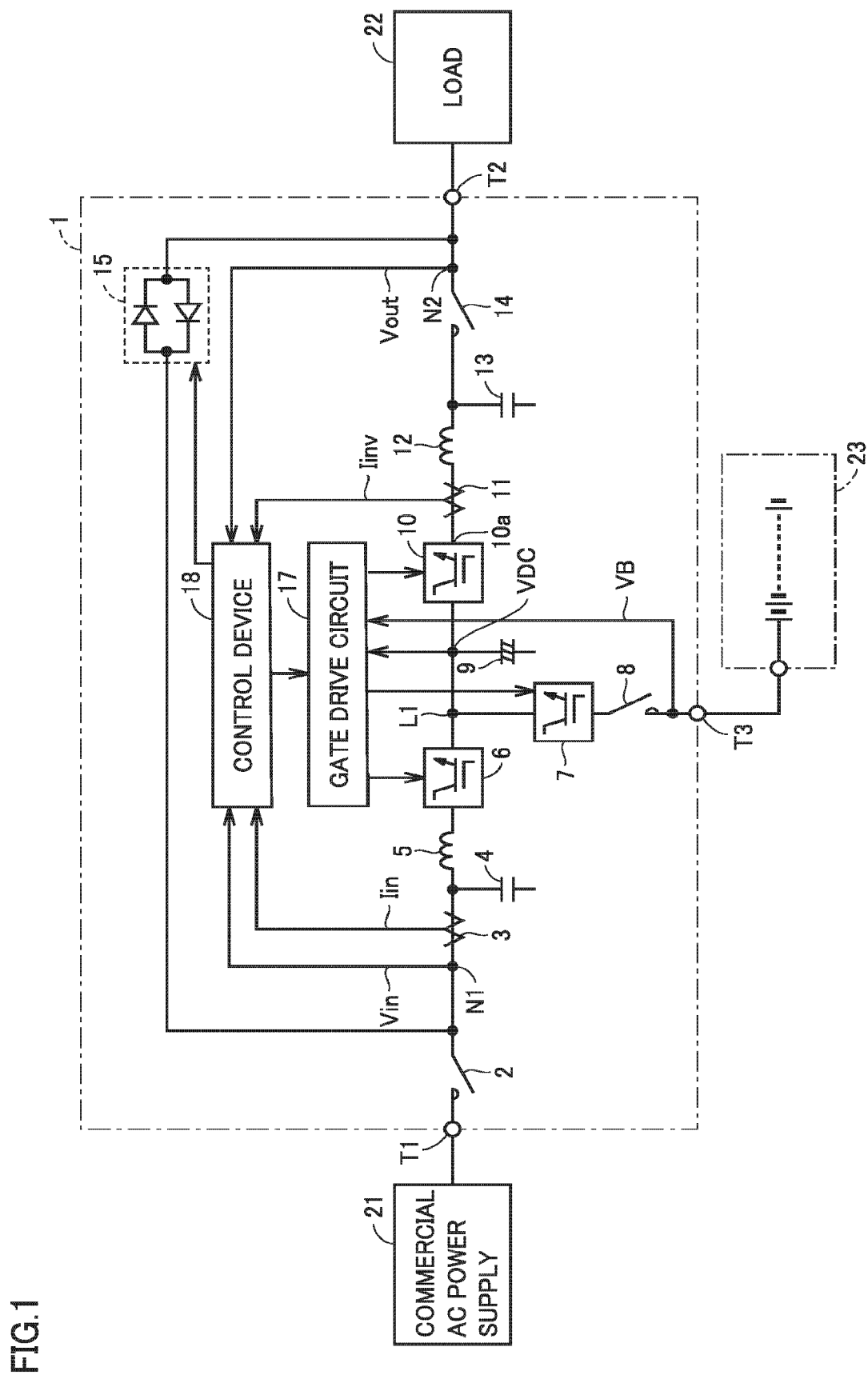
FIG. 1 is a circuit block diagram showing a configuration example of a power conversion unit according to an embodiment.

Embodiments of the present invention will be described in detail below with reference to the drawings. In the following, the same or corresponding parts in the drawings are denoted by the same reference signs and a description thereof will basically not be repeated.

FIG. 1 is a circuit block diagram showing a configuration example of a power conversion unit according to an embodiment. The power conversion unit according to the present embodiment is typically applicable to an uninterruptible power supply apparatus 1. Uninterruptible power supply apparatus 1 temporarily converts three-phase alternating-current (AC) power from a commercial AC power supply 21 to direct-current (DC) power, converts the DC power into three-phase AC power, and supplies the three-phase AC power to a load 22. In FIG. 1, a circuit of a portion corresponding to only one phase (for example, U phase) among three phases (U phase, V phase, and W phase) is shown for simplification of drawings and description.

Uninterruptible power supply apparatus 1 has an inverter power feed mode and a bypass power feed mode. The inverter power feed mode is an operation mode in which AC power is supplied from an inverter 10 to load 22. The bypass power feed mode is an operation mode in which AC power is supplied from commercial AC power supply 21 to load 22 through a semiconductor switch 15.

In the inverter power feed mode, AC power supplied from commercial AC power supply 21 is converted into DC power by a converter 6, and the DC power is converted into AC power by inverter 10 and supplied to load 22. The inverter power feed mode is thus superior in stability of power feeding to load 22.

By comparison, in the bypass power feed mode, AC power supplied from commercial AC power supply 21 is supplied to load 22 through semiconductor switch 15, in other words, not though converter 6 or inverter 10. This mode thus can suppress occurrence of power loss in converter 6 and inverter 10 and consequently can improve the operation efficiency of uninterruptible power supply apparatus 1.

Referring to FIG. 1, uninterruptible power supply apparatus 1 includes an AC input terminal T1, an AC output terminal T2, and a battery terminal T3. AC input terminal T1 receives AC power with a commercial frequency from commercial AC power supply 21.

AC output terminal T2 is connected to load 22. Load 22 is driven by AC power. Battery terminal T3 is connected to a battery (power storage device) 23. Battery 23 stores DC power. Instead of battery 23, a capacitor may be connected.

Uninterruptible power supply apparatus 1 further includes electromagnetic contactors 2, 8, and 14, current detectors 3 and 11, capacitors 4, 9, and 13, reactors 5 and 12, converter 6, a bidirectional chopper 7, inverter 10, semiconductor switch 15, a gate drive circuit 17, and a control device 18.

Electromagnetic contactor 2 and reactor 5 are connected in series between AC input terminal T1 and an input node of converter 6. Capacitor 4 is connected to a node N1 between electromagnetic contactor 2 and reactor 5. Electromagnetic contactor 2 is turned on in use of uninterruptible power supply apparatus 1 and turned off, for example, at the time of maintenance of uninterruptible power supply apparatus 1.

An instantaneous value of AC input voltage Vin appearing at node N1 is detected by control device 18. For example, whether an instantaneous voltage drop or a power failure occurs is determined based on an instantaneous value of AC input voltage Vin. Current detector 3 detects AC input current Iin flowing through node N1 and applies a signal Iin indicating the detected value to control device 18.

Capacitor 4 and reactor 5 constitute a low-pass filter to allow AC power with a commercial frequency to pass from commercial AC power supply 21 to converter 6 and prevent a signal with a switching frequency produced in converter 6 from passing through commercial AC power supply 21.

Converter 6 is controlled by control device 18 and converts (forward-converts) three-phase AC power into DC power to output the DC power to DC line L1, in normal times in which AC power is supplied from commercial AC power supply 21. In a power failure in which supply of AC power from commercial AC power supply 21 is stopped, the operation of converter 6 is stopped. An output voltage of converter 6 is controllable to a desired value.

Capacitor 9 is connected to DC line L1 to smooth voltage on DC line L1. An instantaneous value of DC voltage VDC appearing on DC line L1 is detected by control device 18. DC line L1 is connected to a high voltage-side node of bidirectional chopper 7, and a low voltage-side node of bidirectional chopper 7 is connected to battery terminal T3 through electromagnetic contactor 8.

Electromagnetic contactor 8 is turned on in use of uninterruptible power supply apparatus 1 and turned off, for example, at the time of maintenance of uninterruptible power supply apparatus 1 and battery 23. An instantaneous value of terminal-to-terminal voltage VB of battery 23 that appears at battery terminal T3 is detected by control device 18.

Bidirectional chopper 7 is controlled by control device 18 and stores DC power generated by converter 6 into battery 23 in normal times in which AC power is supplied from commercial AC power supply 21, and supplies DC power of battery 23 to inverter 10 through DC line L1 when an instantaneous voltage drop or a power failure occurs.

When DC power is stored into battery 23, bidirectional chopper 7 lowers DC voltage VDC on DC line L1 and applies the lowered voltage to battery 23. When DC power of battery 23 is supplied to inverter 10, bidirectional chopper 7 raises terminal-to-terminal voltage VB of battery 23 and outputs the raised voltage to DC line L1. DC line L1 is connected to an input node of inverter 10.

Inverter 10 is controlled by control device 18 and converts (reverse-converts) DC power supplied from converter 6 or bidirectional chopper 7 through DC line L1 into three-phase AC power with a commercial frequency to output the converted AC power. That is, inverter 10 converts DC power supplied from converter 6 through DC line L1 into three-phase AC power in normal times and converts DC power supplied from battery 23 through bidirectional chopper 7 into three-phase AC power at the time of an instantaneous voltage drop or a power failure. An output voltage of inverter 10 is controllable to a desired value.

An output node 10a of inverter 10 is connected to one terminal of reactor 12, and the other terminal of reactor 12 is connected to AC output terminal T2 through electromagnetic contactor 14. Capacitor 13 is connected to a node N2 between electromagnetic contactor 14 and AC output terminal T2.

Current detector 11 detects an instantaneous value of output current Iinv of inverter 10 and applies a signal Iinv indicating the detected value to control device 18. An instantaneous value of AC output voltage Vout appearing at node N2 is detected by control device 18.

Reactor 12 and capacitor 13 constitute a low-pass filter to allow AC power with a commercial frequency generated by inverter 10 to pass through AC output terminal T2 and prevent a signal with a switching frequency generated in inverter 10 from passing through AC output terminal T2.

Electromagnetic contactor 14 is controlled by control device 18 and is turned on in the inverter power feed mode and turned off in the bypass power feed mode.

Semiconductor switch 15 is a thyristor switch having a pair of thyristors connected in anti-parallel and is connected between AC input terminal T1 and AC output terminal T2. Semiconductor switch 15 is controlled by control device 18 and is turned off in the inverter power feed mode and turned on in the bypass power feed mode.

Specifically, a pair of thyristors constituting the thyristor switch turns on in response to a gate signal input (on) from control device 18. For example, semiconductor switch 15 instantaneously turns on when inverter 10 fails in the inverter power feed mode and supplies three-phase AC power from commercial AC power supply 21 to load 22.

Gate drive circuit 17 controls the switching operation of switching elements that constitute converter 6, bidirectional chopper 7, and inverter 10, based on a gate signal applied from control device 18.

Control device 18 controls the entire uninterruptible power supply apparatus 1 based on AC input voltage Vin, AC input current Iin, DC voltage VDC, terminal-to-terminal voltage VB of battery 23, inverter output current Iinv, AC output voltage Vout, and the like. The control of uninterruptible power supply apparatus 1 by control device 18 will be described later.

Control device 18 can be configured with, for example, a microcomputer. As an example, control device 18 contains a memory and a CPU (Central Processing Unit) not shown in the drawings, and the CPU can execute a program stored in the memory in advance and thereby perform a control operation described later through a software process. Alternatively, part or the whole of the control operation may be implemented by a hardware process using a dedicated built-in electronic circuit or the like, instead of the software process.

Figure 2:
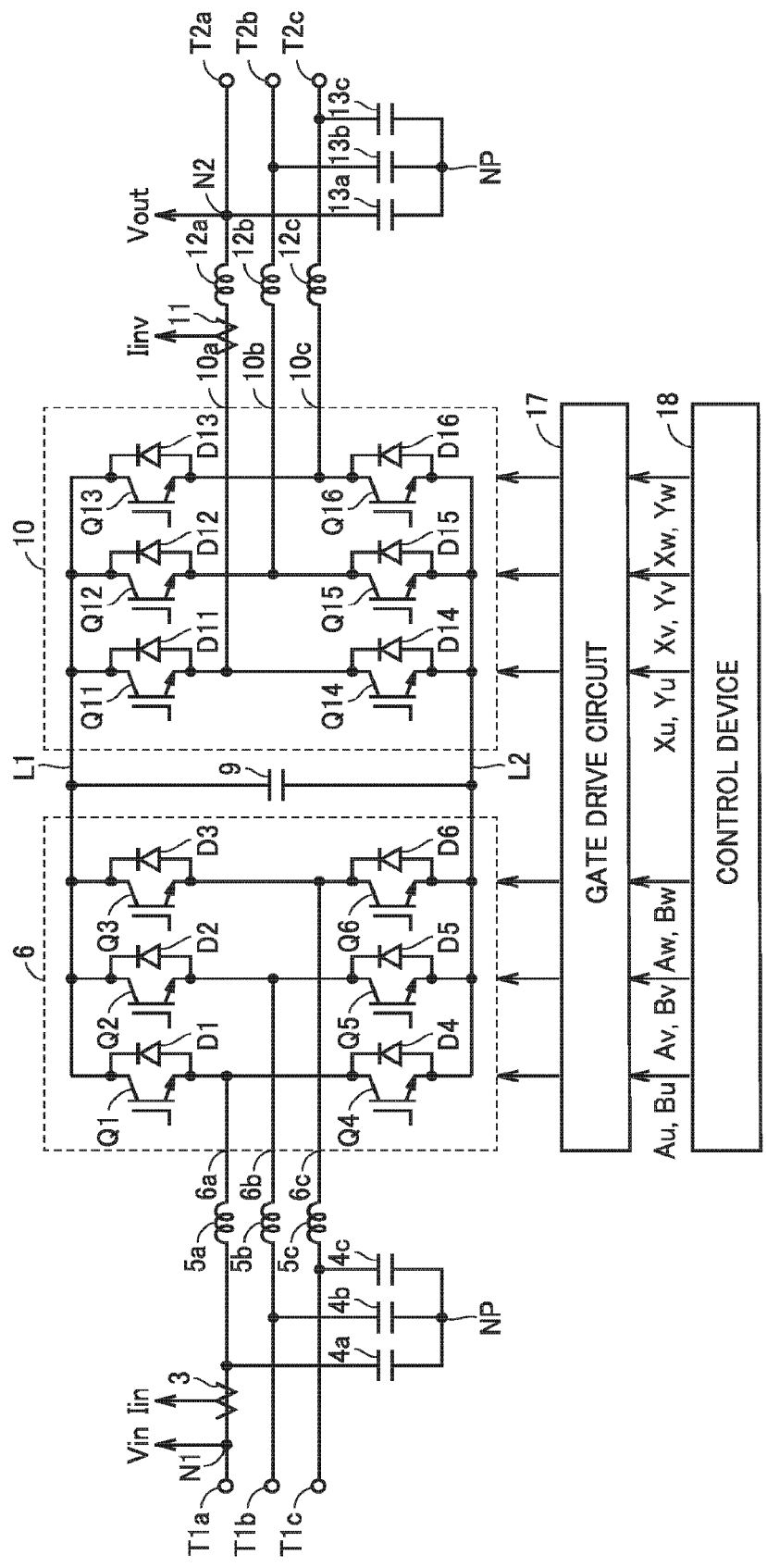
FIG. 2 is a circuit diagram showing the main part of an uninterruptible power supply apparatus shown in FIG. 1.

FIG. 2 is a circuit diagram showing the main part of uninterruptible power supply apparatus 1 shown in FIG. 1. Although FIG. 1 shows only the part related to one phase among three phase AC voltages, FIG. 2 shows a part related to three phases. The illustration of electromagnetic contactors 2 and 14 and semiconductor switch 15 is omitted.

In FIG. 2, uninterruptible power supply apparatus 1 includes AC input terminals T1a, T1b, and T1c, AC output terminals T2a, T2b, and T2c, current detectors 3 and 11, capacitors 9, 4a, 4b, 4c, 13a, 13b, and 13c, reactors 5a, 5b, 5c, 12a, 12b, and 12c, converter 6, DC lines L1 and L2, and inverter 10.

AC input terminals T1a, T1b, and T1c respectively receive three phase AC voltages (U-phase AC voltage, V-phase AC voltage, and W-phase AC voltage) from commercial AC power supply 21 (FIG. 1). Three phase AC voltages synchronized with three phase AC voltages from commercial AC power supply 21 are output to AC output terminals T2a, T2b, and T2c. Load 22 is driven by three phase AC voltages from AC output terminals T2a, T2b, and T2c.

Reactors 5a, 5b, and 5c each have one terminal connected to the corresponding one of AC input terminals T1a, T1b, and T1c and have the other terminals respectively connected to input nodes 6a, 6b, and 6c of converter 6. Capacitors 4a, 4b, and 4c each have one electrode connected to one terminal of the corresponding one of reactors 5a, 5b, and 5c and have the other electrodes connected together to a neutral point NP.

Capacitors 4a, 4b, and 4c and reactors 5a, 5b, and 5c constitute a low-pass filter to allow three phase AC powers with a commercial frequency to pass from AC input terminals T1a, T1b, and T1c to converter 6 and cut off a signal with a switching frequency produced in converter 6. An instantaneous value of AC input voltage Vin appearing at one terminal of reactor 5a is detected by control device 18 (FIG. 1). Current detector 3 detects AC input current Iin flowing through node N1 (that is, AC input terminal T1a) and applies a signal Iin indicating the detected value to control device 18.

Converter 6 includes IGBTs (Insulated Gate Bipolar Transistors) Q1 to Q6 and diodes D1 to D6. The IGBT constitute a "semiconductor switching element". The collectors of IGBTs Q1 to Q3 are connected together to DC line L1, and the emitters thereof are respectively connected to input nodes 6a, 6b, and 6c. The collectors of IGBTs Q4 to Q6 are respectively connected to input nodes 6a, 6b, and 6c, and the emitters thereof are connected together to DC line L2. Diodes D1 to D6 are respectively connected in anti-parallel with IGBTs Q1 to Q6.

IGBTs Q1 and Q4 are respectively controlled by gate signals Au and Bu, IGBTs Q2 and Q5 are respectively controlled by gate signals Av and By, and IGBTs Q3 and Q6 are respectively controlled by gate signals Aw and Bw. Gate signals Bu, By, and Bw are respectively inversion signals of gate signals Au, Av, and Aw.

IGBTs Q1 to Q3 turn on when gate signals Au, Av, and Aw are brought to H (logic high) level, respectively, and turn off when gate signals Au, Av, and Aw are brought to L (logic low) level, respectively. IGBTs Q4 to Q6 turn on when gate signals Bu, By, and Bw are brought to H level, respectively, and turn off when gate signals Bu, By, and Bw are brought to L level, respectively.

Each of gate signals Au, Bu, Av, By, Aw, and Bw is a pulse signal train and a PWM (Pulse Width Modulation) signal. The phase of gate signals Au and Bu, the phase of gate signals Av and By, and the phase of gate signals Aw and Bw are shifted from each other by 120 degrees. Gate signals Au, Bu, Av, By, Aw, and Bw are generated by control device 18. Control device 18 outputs the generated gate signals Au, Bu, Av, By, Aw, and Bw to gate drive circuit 17. Gate drive circuit 17 turns on and off each of IGBTs Q1 to Q6 in accordance with gate signals Au, Bu, Av, By, Aw, and Bw.

Each of IGBTs Q1 to Q6 is turned on and off at a predetermined timing by gate signals Au, Bu, Av, By, Aw, and Bw, and the ON time of each of IGBTs Q1 to Q6 is adjusted, whereby three phase AC voltages applied to input nodes 6a to 6c can be converted into DC voltage VDC (terminal-to-terminal voltage of capacitor 9).

Inverter 10 includes IGBTs Q11 to Q16 and diodes Dl1 to D16. The IGBT constitute a "semiconductor switching element". The collectors of IGBTs Q11, Q12, and Q13 are connected together to DC line L1, and the emitters thereof are respectively connected to output nodes 10a, 10b, and 10c. The collectors of IGBTs Q14, Q15, and Q16 are respectively connected to output nodes 10a, 10b, and 10c, and the emitters thereof are connected together to DC line L2. Diodes D11 to D16 are respectively connected in anti-parallel with IGBTs Q11 to Q16.

IGBTs Q11 and Q14 are respectively controlled by gate signals Xu and Yu, IGBTs Q12 and Q15 are respectively controlled by gate signals Xv and Yv, and IGBTs Q13 and Q16 are respectively controlled by gate signals Xw and Yw. Gate signals Yu, Yv, and Yw are respectively inversion signals of gate signals Xu, Xv, and Xw.

IGBTs Q11 to Q13 turn on when gate signals Xu, Xv, and Xw are brought to H level, respectively, and turn off when gate signals Xu, Xv, and Xw are brought to L level, respectively. IGBTs Q14 to Q16 turn on when gate signals Yu, Yv, and Yw are brought to H level, respectively, and turn off when gate signals Yu, Yv, and Yw are brought to L level, respectively.

Each of gate signals Xu, Yu, Xv, Yv, Xw, and Yw is a pulse signal train and a PWM signal. The phase of gate signals Xu and Yu, the phase of gate signals Xv and Yv, and the phase of gate signals Xw and Yw are shifted from each other by 120 degrees. Gate signals Xu, Yu, Xv, Yv, Xw, and Yw are generated by control device 18. Control device 18 outputs the generated gate signals Au, Bu, Av, By, Aw, and Bw to gate drive circuit 17. Gate drive circuit 17 turns on and off each of IGBTs Q11 to Q16 in accordance with gate signals Xu, Yu, Xv, Yv, Xw, and Yw.

Each of IGBTs Q11 to Q16 is turned on and off at a predetermined timing by gate signals Xu, Yu, Xv, Yv, Xw, and Yw, and the ON time of each of IGBTs Q11 to Q16 is adjusted, whereby DC voltage VDC between DC lines L1 and L2 can be converted into three phase AC voltages.

Reactors 12a, 12b, and 12c each have one terminal connected to the corresponding one of output nodes 10a, 10b, and 10c of inverter 10 and have the other terminals respectively connected to AC output terminals T2a, T2b, and T2c. Capacitors 13a, 13b, and 13c each have one electrode connected to the other terminal of the corresponding one of reactors 12a, 12b, and 12c and have the other electrodes connected together to neutral point NP.

Reactors 12a, 12b, and 12c and capacitors 13a, 13b, and 13c constitute a low-pass filter to allow three phase AC powers with a commercial frequency to pass from inverter 10 to AC output terminals T2a, T2b, and T2c and cut off a signal with a switching frequency produced in inverter 10.

Current detector 11 detects inverter output current Iinv flowing through reactor 12a and applies a signal Iinv indicating the detected value to control device 18. An instantaneous value of AC output voltage Vout appearing at the other terminal (node N2) of reactor 12a is detected by control device 18 (FIG. 1).

Figure 3:
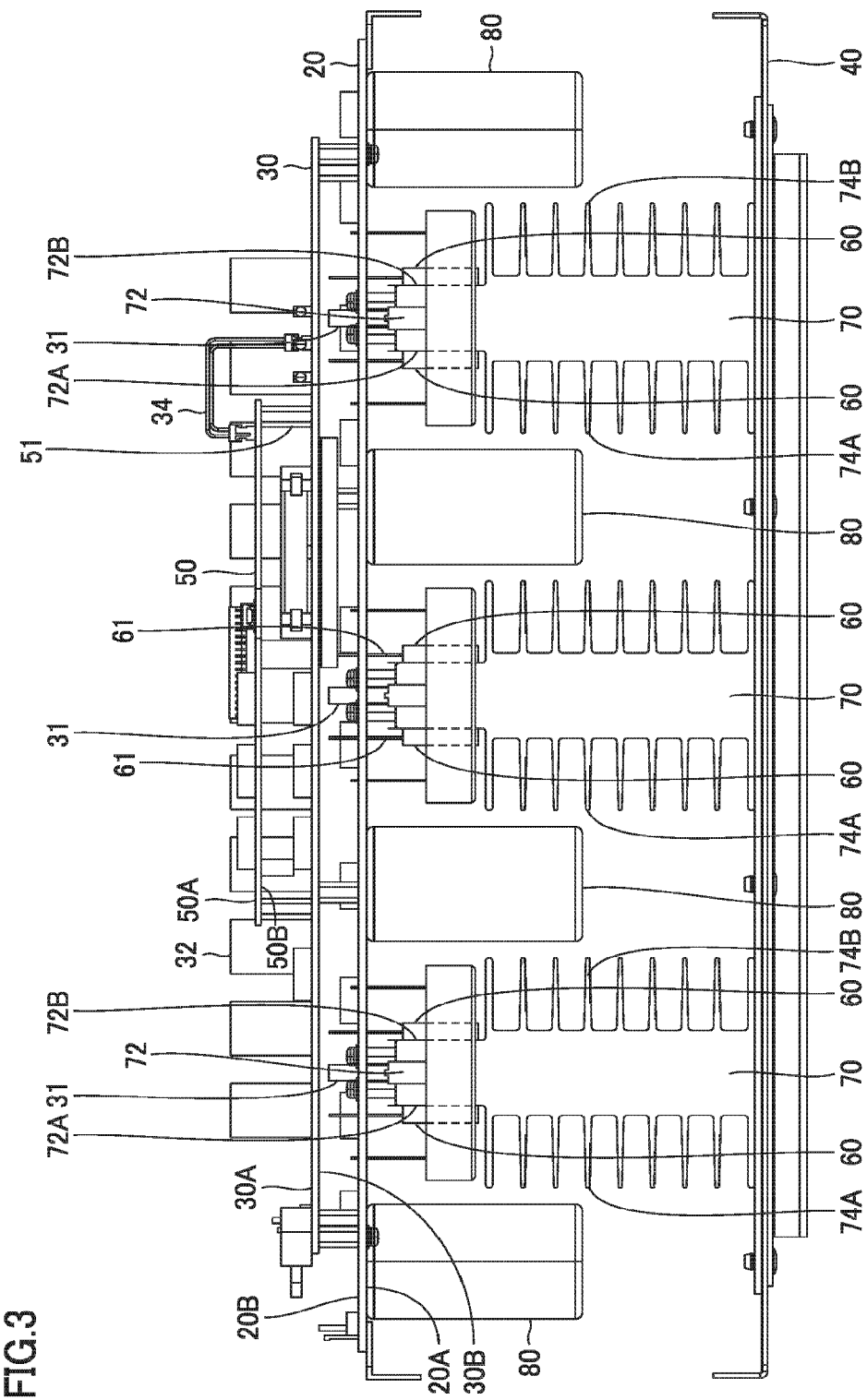
FIG. 3 is a plan view of the uninterruptible power supply apparatus.
Figure 4:
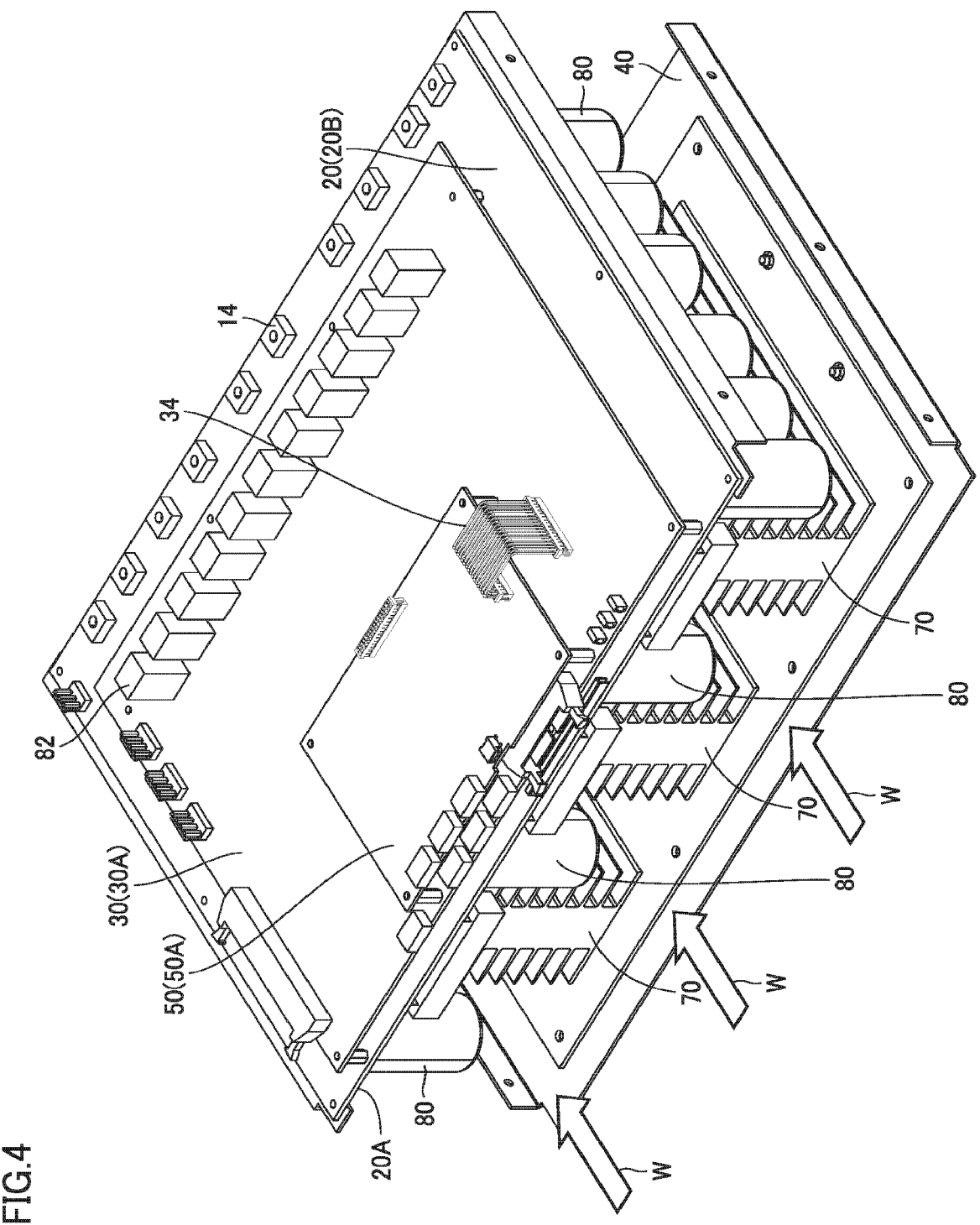
FIG. 4 is a perspective view of the uninterruptible power supply apparatus.

A mounting structure of the power conversion unit according to the present embodiment will now be described. FIG. 3 is a plan view of uninterruptible power supply apparatus 1. FIG. 4 is a perspective view of uninterruptible power supply apparatus 1. In uninterruptible power supply apparatus 1, the power conversion unit is stored in a rectangular parallelepiped-shaped case. A fan for sucking cooling air into the case is provided on a front surface of the case. An exhaust port for exhausting cooling air is provided on a rear surface of the case. FIG. 3 and FIG. 4 show a plan view and a perspective view of the power conversion unit with the case and the fan removed.

Referring to FIG. 3, uninterruptible power supply apparatus 1 further includes a bottom plate 40, substrates 20, 30, and 50, a plurality of semiconductor modules 60, and a plurality of heat sinks 70. Bottom plate 40 forms a bottom plate of the not-shown case. In the example in FIG. 3 and FIG. 4, uninterruptible power supply apparatus 1 has three heat sinks 70. However, the number of heat sinks 70 is not limited thereto.

First substrate 20 is formed in the shape of a flat plate and has a shape of a substantially rectangular plate. First substrate 20 has a first surface 20A and a second surface 20B on the opposite side to first surface 20A. First substrate 20 is arranged in parallel with bottom plate 40 such that first surface 20A faces bottom plate 40. On first surface 20A of first substrate 20, a plurality of semiconductor modules 60, a plurality of heat sinks 70, and a plurality of capacitors 80 are mounted.

Each of a plurality of semiconductor modules 60 includes an IGBT (semiconductor switching element) and a diode shown in FIG. 2. Semiconductor module 60 has a configuration, for example, in which an IGBT and a diode are mounted on a planar substrate. The IGBT and the diode are electrically connected through a wiring layer formed of a bonding wire or a conductor. The IGBT and the diode are sealed together with the substrate, the bonding wire, and the wiring layer with resin. The resin is formed in the shape of a substantially rectangular plate. Each semiconductor module 60 further has a plurality of terminals 61 protruding in parallel with each other from one side of the substantially rectangular plate-shaped resin. A plurality of terminals 61 are connected to first substrate 20, whereby each semiconductor module 60 is mounted on first substrate 20.

A plurality of (for example, three) heat sinks 70 each have a base 72 and fins 74A and 74B. Base 72 and fins 74A and 74B are formed of, for example, a metal having high thermal conductivity, such as aluminum or copper. Base 72 is formed in the shape of a flat plate and has a shape of a substantially rectangular plate. Base 72 has a first surface 72A and a second surface 72B on the opposite side to first surface 72A. A first base portion of base 72 is fixed to first surface 20A of first substrate 20 by a fastening member such as bolt. A second base portion of base 72 on the opposite side to the first base portion is fixed to bottom plate 40.

In base 72 of each heat sink 70, first surface 72A and second surface 72B extend in the vertical direction relative to first surface 20A of first substrate 20. A plurality of heat sinks 70 are arranged such that, between adjacent two heat sinks 70, first surface 72A of base 72 of one heat sink 70 and second surface 72B of base 72 of the other heat sink 70 face each other in parallel with each other.

On each of first surface 72A and second surface 72B of base 72, a plurality of semiconductor modules 60 are arranged side by side in parallel. Each semiconductor module 60 is arranged on base 72 such that one surface of the rectangular plate-shaped resin is in surface contact with first surface 72A or second surface 72B.

In each heat sink 70, fin 74A is fixed to first surface 72A of base 72. Fin 74A protrudes vertically relative to first surface 72A. Fin 74B is fixed to second surface 72B of base 72. Fin 74B protrudes vertically relative to second surface 72B. With this configuration, in each heat sink 70, semiconductor modules 60 can be arranged on both surfaces of the flat plate-shaped base 72, and fins 74A and 74B can be arranged on both surfaces of base 72, thereby achieving size reduction of heat sink 70 while keeping the cooling performance for semiconductor modules 60.

A plurality of capacitors 80 are arranged side by side so as to stand on first surface 20A of first substrate 20. A plurality of capacitors 80 configure capacitors 9, 4a, 4b, 4c, 13a, 13b, and 13c shown in FIG. 2. Each of a plurality of capacitors 80 has a cylindrical portion and two terminals provided on one end thereof. The two terminals are connected to first substrate 20, whereby each capacitor 80 is mounted on first substrate 20.

As shown in FIG. 3, a plurality of capacitors 80 are arranged on both sides of bases 72 of a plurality of heat sinks 70. Some of a plurality of capacitors 80 are arranged in a space formed between two bases 72 arranged in parallel with each other. In the example in FIG. 3 and FIG. 4, a plurality of capacitors 80 are arranged in one row in the space. However, the number of rows is not limited thereto.

Second substrate 30 is formed in the shape of a flat plate and has a shape of a substantially rectangular plate. Second substrate 30 has a first surface 30A and a second surface 30B on the opposite side to first surface 30A. Second substrate 30 is arranged above first substrate 20 such that second surface 30B faces second surface 20B of first substrate 20. Second substrate 30 is electrically connected to first substrate 20 through a plurality of connectors 31 provided on second surface 20B of first substrate 20.

Gate drive circuit 17 (see FIG. 1 and FIG. 2) is formed on first surface 30A of second substrate 30. Gate drive circuit 17 is an insulation-type gate driver and includes a transformer 82 that is an insulating element and a not-shown buffer circuit.

Third substrate 50 is formed in the shape of a flat plate and has a shape of a substantially rectangular plate. Third substrate 50 has a first surface 50A and a second surface 50B on the opposite side to first surface 50A. Third substrate 50 is arranged above second substrate 30 such that second surface 50B faces first surface 30A of second substrate 30. Third substrate 50 is fixed to second substrate 30 using a fastening member 51 such as bolt. Third substrate 50 is electrically connected to second substrate 30 through a connector provided on first surface 30A of second substrate 20.

Control device 18 (see FIG. 1 and FIG. 2) is disposed on first surface 50A of third substrate 50. Control device 18 includes a memory and a CPU not shown in the drawing.

Gate drive circuit 17 formed on first surface 30A of second substrate 30 and control device 18 formed on first surface 50A of third substrate 50 are electrically connected through a plurality of wiring 34 formed of a conductor.

In the mounting structure of the power conversion unit according to the present embodiment described above, first substrate 20, second substrate 30, and third substrate 50 are arranged so as to be stacked in the vertical direction relative to bottom plate 40 of the case. In this way, the area occupied by the power conversion unit in bottom plate 40 of the case can be reduced, compared with a configuration in which a power conversion unit is mounted on a single substrate.

Figure 5:
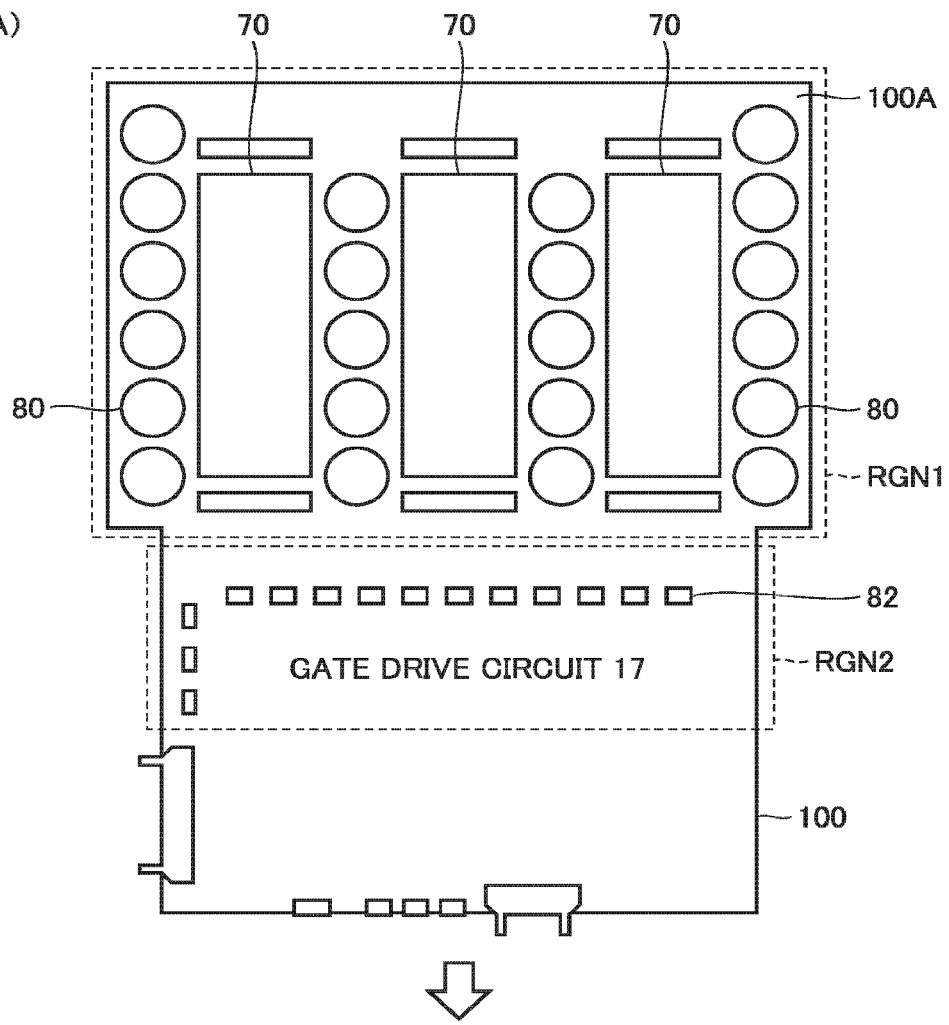
FIG. 5 is a diagram illustrating the operation effect of the power conversion unit according to the present embodiment.
Figure 5:
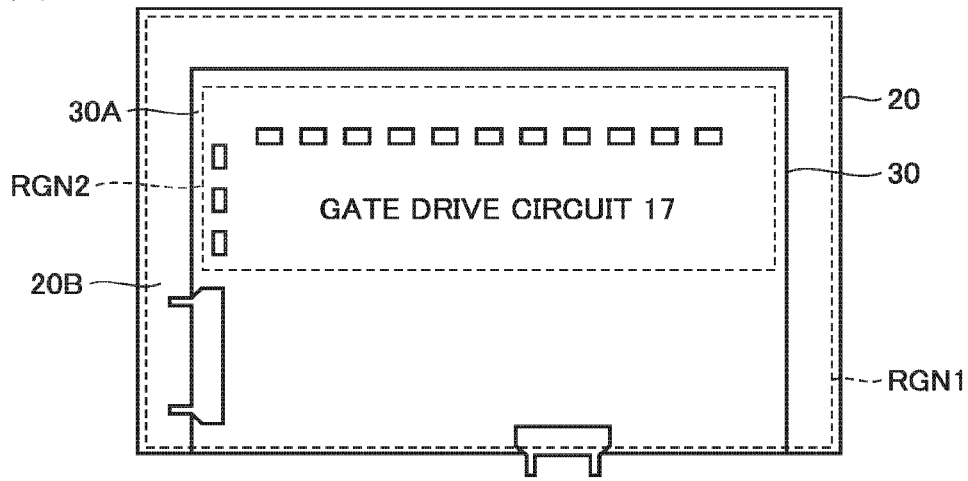

FIG. 5(A) shows a mounting structure of a conventional power conversion unit. As shown in FIG. 5(A), in the conventional power conversion unit, a plurality of semiconductor modules (not shown), a plurality of heat sinks 70, a plurality of capacitors 80, and gate drive circuit 17 are mounted on a single substrate 100. Substrate 100 is formed in the shape of a flat plate and has a first surface 100A and a second surface on the opposite side to first surface 100A. In a first region RGN1 of first surface 100A of substrate 100, a plurality of semiconductor modules 60, a plurality of heat sinks 70, and a plurality of capacitors 80 are arranged. In a second region RGN2 of first surface 100A of substrate 100, gate drive circuit 17 is arranged. Each semiconductor module 60 is electrically connected to gate drive circuit 17 through a not-shown wire.

FIG. 5(B) shows a mounting structure of the power conversion unit according to the present embodiment. As shown in FIG. 5(B), the power conversion unit according to the present embodiment is divided into first substrate 20 having a first region RGN1 and second substrate 30 having a second region RGN2. Second substrate 30 is arranged so as to be stacked on first substrate 20. The area occupied by the power conversion unit is therefore substantially equal to the area of first substrate 20 and can be reduced compared with the area of substrate 100 of the conventional power conversion unit.

In the mounting structure of the power conversion unit according to the present embodiment, semiconductor module 60 and capacitor 80 mounted on first substrate 20 and gate drive circuit 17 mounted on second substrate 30 are electrically connected through connector 31 mounted on second surface 20A of first substrate 20. The wire connected between semiconductor module 60 and gate drive circuit 17 thus can be eliminated, compared with the conventional power conversion unit.

In the conventional power conversion unit, common mode noise occurs in the wire connecting semiconductor module 60 and gate drive circuit 17 in the switching operation of the IGBT. PTL 1 discloses a configuration in which a common mode reactor or a hollow core made of a magnetic substance is inserted in the wire, as means for reducing the common mode noise. While this configuration can reduce the common mode noise, installation of the common mode reactor or the core may lead to size increase and cost increase of the power conversion unit. By contrast, the power conversion unit according to the present embodiment does not require a wire for connecting semiconductor module 60 and gate drive circuit 17 and therefore can suppress influence of common mode noise. Since the installation of a common mode reactor or a core is not required, size increase and cost increase of the power conversion unit can be suppressed.

Furthermore, in the mounting structure of the power conversion unit according to the present embodiment, as shown by arrow W in FIG. 4, a path through which cooling air passes is formed in a gap between first surface 20A of first substrate 20 and bottom plate 40 of the case. In operation of uninterruptible power supply apparatus 1, power loss including conduction loss and switching loss occurs in the IGBT, and the IGBT generates heat. The heat generated in the IGBT is transmitted from each semiconductor module 60 to fins 74A and 74B via base 72 and emitted from fins 74A and 74B. Heat generated in capacitor 80 is also emitted. The emitted heat is exhausted to the outside of the casing through cooling air.

In this way, a plurality of semiconductor modules 60 and a plurality of capacitors 80 are cooled by the cooling air passing through between first surface 20A of first substrate 20 and bottom plate 40. Since gate drive circuit 17 is mounted on second substrate 30 separate from first substrate 20 and thus arranged at a distance from the passage path of the cooling air. Direct exposure of gate drive circuit 17 to the cooling air is thus avoided. This configuration can prevent dust and water droplets from adhering to gate drive circuit 17 when the cooling air includes dust and water droplets. As a result, reduction in dielectric strength of an insulator due to contamination/damage and moisture absorption of gate drive circuit 17 can be prevented.

The power conversion unit according to the present embodiment is not necessarily applied to an uninterruptible power supply apparatus and is applicable to any other power conversion apparatuses.

The embodiments disclosed here should be understood as being illustrative rather than being limitative in all respects. The scope of the present invention is shown not in the foregoing description but in the claims, and it is intended that all modifications that come within the meaning and range of equivalence to the claims are embraced here.

REFERENCE SIGNS LIST

1 uninterruptible power supply apparatus, 2, 8, 14 electromagnetic contactor, 3, 11 current detector, 4, 4*a* to 4*c*, 9, 13, 13*a* to 13*c*, 80 capacitor, 5, 5*a* to 5*c*, 12, 12*a* to 12*c* reactor, 6 converter, 7 bidirectional chopper, 10 inverter, 15 semiconductor switch, 17 gate drive circuit, 18 control device, 20 first substrate, 30 second substrate, 50 third substrate, 21 commercial AC power supply, 22 load, 23 battery, 31 connector, 34 wiring, 40 bottom plate, 51 fastening member, 60 semiconductor module, 61 terminal, 70 heat sink, 72 base, 74A, 74B fin, 82 transformer, 100 substrate, Q1 to Q6, Q11 to Q16 IGBT, D1 to D6, D11 to D16 diode.

The invention claimed is:

1. A power conversion unit comprising:
   a plurality of semiconductor modules each including a semiconductor switching element;
   a gate drive circuit that drives the semiconductor modules;
   a first substrate having a flat plate shape, the first substrate including a first surface facing a bottom plate of a casing accommodating the semiconductor modules and the gate drive circuit, and a second surface on an opposite side to the first surface; and
   a second substrate having a flat plate shape, the second substrate being arranged above the first substrate in parallel with the second surface, wherein
   the semiconductor modules are mounted on the first surface,
   the gate drive circuit is formed on a surface of the second substrate on a side that does not face the second surface,
   the power conversion unit further comprising:
   a connector provided on the second surface and connected to a surface on a side facing the second substrate; and
   a heat sink mounted on the first surface, wherein
   the heat sink includes a base having a flat plate shape provided vertically to the first surface and fins fixed to both surfaces of the base,
   the semiconductor modules are arranged side by side on both surfaces of the base, and
   a path through which cooling air passes is formed in a gap between the bottom plate and the first surface.

2. The power conversion unit according to claim 1, further comprising a plurality of capacitors,
   wherein the capacitors are mounted on the first surface.

3. The power conversion unit according to claim 1, further comprising:
   a control device that generates a gate signal for controlling the semiconductor switching element of each of the semiconductor modules and outputs the gate signal to the gate drive circuit; and
   a third substrate having a flat plate shape, the third substrate being arranged above the second substrate in parallel with the second substrate, wherein the control device is disposed on a surface of the third substrate on a side that does not face the second substrate.

\* \* \* \* \*